(12) United States Patent
Simons et al.

(10) Patent No.: US 7,957,438 B2
(45) Date of Patent: Jun. 7, 2011

(54) METHOD AND DEVICE FOR MONITORING LIGHT

(75) Inventors: David Simons, Santa Rosa, CA (US); Boris Kharlamov, Santa Rosa, CA (US); James Wong, Santa Rosa, CA (US); Vincent Issier, Windsor, CA (US); Andy Miller, Windsor, CA (US); James Nunley, La Forestville, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 59 days.

(21) Appl. No.: 12/336,081

(22) Filed: Dec. 16, 2008

(65) Prior Publication Data

US 2009/0154512 A1 Jun. 18, 2009

Related U.S. Application Data

(60) Provisional application No. 61/014,294, filed on Dec. 17, 2007.

(51) Int. Cl.
*H01S 3/13* (2006.01)

(52) U.S. Cl. ........... 372/29.021; 372/29.02; 372/29.014; 372/29.011; 372/29.01

(58) Field of Classification Search ............. 372/29.021, 372/29.02, 29.014, 29.011, 29.01
See application file for complete search history.

(56) References Cited

U.S. PATENT DOCUMENTS

| 6,243,508 | B1 * | 6/2001 | Jewell et al. | 385/14 |
| 6,778,585 | B2 * | 8/2004 | Malone | 372/108 |
| 7,146,073 | B2 * | 12/2006 | Wan | 385/29 |

* cited by examiner

*Primary Examiner* — Kinam Park
(74) *Attorney, Agent, or Firm* — Matthew A. Pequignot; Pequignot + Myers LLC

(57) ABSTRACT

A method for monitoring laser light launched into a core of a single mode fiber includes launching a portion of light directly into the cladding about the core. The cladding launched light is a known fraction of the core launched light and can be monitored by placing a detector about the cladding. Detected light including light that was launched into the cladding and has leaked through the cladding is used as a known fraction of light in the core and can be used to control the laser light source. This can be done with a straight section of single mode optical fiber and does not require bending the fiber. Advantageously, most of the core launched light remains in the core as guided light.

11 Claims, 2 Drawing Sheets

METHOD AND DEVICE FOR MONITORING LIGHT

CROSS REFERENCE TO RELATED APPLICATIONS

This application claims priority of U.S. Provisional Patent Application No. 61/014,294 filed Dec. 17, 2007, entitled "Monitoring output power of laser using scattered light in output fiber" which is incorporated herein by reference for all purposes.

FIELD OF THE INVENTION

This invention relates generally to a method and device for detecting and monitoring light launched into a cladding of a single mode optical fiber.

BACKGROUND OF THE INVENTION

When laser light is launched in an optical fiber it is often required that the power of the light entering the fiber be estimated by way of being monitored. Generally a known portion of the light is extracted and detected, and this detected portion provides an indication of the power of the total laser light propagating within the optical fiber.

Numerous methods and systems have been envisaged for tapping a portion of the light received from a laser propagating within an optical fiber. Some of these methods are complex and costly to implement.

For example, U.S. Pat. No. 6,778,585 in the name of Malone, assigned to Optical Communication Products, Inc., incorporated herein by reference, relates primarily to VCSELS. Within optical communication systems utilizing VCSELs, or in fiber laser systems or diode laser systems it is important to control the optical data signal being transmitted. Because VCSELs which are commonly used in today's optoelectronics industry, emit a unidirectional light beam normal to the surface in which they are formed, it is especially difficult to monitor the output optical power of the VCSEL which provides the data signal without attenuating or otherwise compromising the integrity of the light emitted. In order to control the output optical power of a VCSEL and to maintain the optical power at a desired level, the output optical power must first be monitored. Based on the monitored output optical power, adjustments can be made to the current signals supplied to the VCSEL to control the output optical power of the VCSEL which provides the data signal.

As described in U.S. Pat. No. 6,778,585, refracted ray coupling techniques, also known as "Refracted Near Field" techniques, are used in the field of optoelectronics to characterize optical fibers, the contents of which are herein incorporated by reference.

In many laser systems, when an optical source, such as a laser, is coupled to an optical fiber, preferably most of the light propagates as guided rays in the core of the optical fiber. The portion of light, entering the core under an angle, larger than the critical angle, is not totally reflected, but is partially refracted into the cladding. The amount of this light depends of mismatch between numerical aperture (NA) of the focusing system and NA of the optical fiber. The light, refracted into cladding, is once more refracted on the boundary between cladding and outer cover and, partially reflected, penetrates into the cover layer and, finally exits into the free space outside of the fiber. The portion of the light, remaining in the cladding, creates high order cladding modes, but, since the reflection angle for these modes is smaller than critical angle, they are strongly leaking both into core and outside. Therefore, their propagation length is very short. U.S. Pat. No. 6,778,585 suggests using this light, refracted from the cladding and, finally, coming out of fiber, to monitor power inside the fiber. A complex and costly light collection system, in the form of a refracted ray coupler, is disclosed as a means of monitoring this light exiting the core and the cladding. This design suggested in U.S. Pat. No. 6,778,585, incorporated herein by reference, essentially uses the properties of refracted rays. These rays are well directed in the limited spatial angle; and, they emerge out of fiber only at very short distance from the fiber input.

There is one important aspect, which is not discussed in U.S. Pat. No. 6,778,585, which we believe is important for function of the device, described therein. The scheme is characteristic for multimode fibers with large core diameter. Having a large core is most practical for this type of light coupling and resultant light collection from light that has escaped the core through the cladding.

In contrast, this invention provides a solution that is particularly useful with single mode optical fibers and wherein a small portion of light launched directly into the cladding from an end of the optical fiber and propagating in the cladding as low order modes is monitored and wherein the requirement for a refracted ray coupler is obviated.

Furthermore this invention does not require bending the optical fiber to tap light therefrom. However, a section of optical fiber with a bend radius of less than 20 mm may be used for monitoring light within the optical fiber.

It is therefore an object of this invention to provide a method for monitoring cladding launched light by directly detecting portions of the cladding launched light by using a detector disposed adjacent to and along a side of the fiber, utilizing the spatially homogeneous distribution of light scattered from the cladding.

It is a further object of this invention to provide a single mode optical fiber carrying light to be monitored by a photodiode positioned so that light exiting the fiber is detected after having propagated only though free space between the fiber and a photodiode.

SUMMARY OF THE INVENTION

In accordance with an aspect of this invention a method of monitoring light is provided comprising:

a) launching a beam of light into an end of a single mode optical fiber having a core having a refractive index $n_1$ and having a cladding surrounding the core, having a refractive index $n_2$, wherein $n_1 > n_2$, wherein a first portion $P_1$ of the beam launched into the end of the single mode fiber is launched into the core at a first end face of the optical fiber, and wherein a second portion $P_2$ of the beam of light is launched directly into the cladding at the first end face of the optical fiber, and wherein $P_2/P_1 > 0.05$; and b) detecting along a side of the optical fiber adjacent the cladding at a first location near the end of the fiber with a photodetector disposed along side of the fiber, a portion of light $P_3$ that was launched into the fiber, wherein the portion of light $P_3$ includes more than 0.5% of $P_2$ and no more than 0.003% of $P_1$.

In accordance with the invention there is further provided a method of monitoring light launched into the cladding of a single mode optical fiber, comprising the steps of:

disposing a photodetector at a first location downstream from a launch end of the single mode optical fiber; launching a beam having optical power P into the launch end of the optical fiber, wherein a portion of the beam having power $P_2$ is launched into the cladding in the launch end of the optical fiber, and wherein a portion of the beam having power $P_1$ is launched into the core in the launch end of the optical fiber;

and detecting a greater amount of the portion of the beam having power $P_2$ than the portion of the beam having power $P_1$ with the detector disposed adjacent to the cladding.

BRIEF DESCRIPTION OF THE DRAWINGS

Exemplary embodiments will now be described in conjunction with the drawings in which.

DETAILED DESCRIPTION

In an ideal device, where light from a laser is to be efficiently coupled into a single mode optical fiber, 100% of the light exiting the laser would be coupled into the core of a single mode fiber so as to be guided down the core and confined to the core by the cladding for delivery to an optical element or optical receiver. If a portion the laser light beam is launched and couples into the cladding of the optical fiber, this cladding coupled light generally scatters and escapes the cladding into the outer coating and then propagates into the environment outside of the fiber. If the coupling between the optical source and the single mode optical fiber is stable over time, it can be assumed that the light exiting the cladding is representative proportionally of the light launched into the core, or that there is at least a predictable relationship between the amount of power of the light escaping the cladding and amount of power of the light within the core.

This invention utilizes this phenomenon to provide a feedback signal derived of light launched directly into the cladding, indicative of the power of the light propagating within the core.

Contrary to the aforementioned prior art which utilizes light that escapes the core and exits the fiber through the cladding with well defined and rather narrow spatial distribution to estimate the power of light within the core itself, this invention primarily utilizes light launched directly into the cladding via an end of the single mode optical fiber, which propagates through the cladding as low order modes and escapes the cladding primarily due to scattering, and monitors a portion of this light after it has left the cladding and entered free space about the periphery of the single mode optical fiber. Thus, we have shown that most of the light detected by the detector adjacent the side of the fiber, is light that was launched directly into the cladding at an end of the optical fiber rather than light that was launched into the core.

Figure 1:
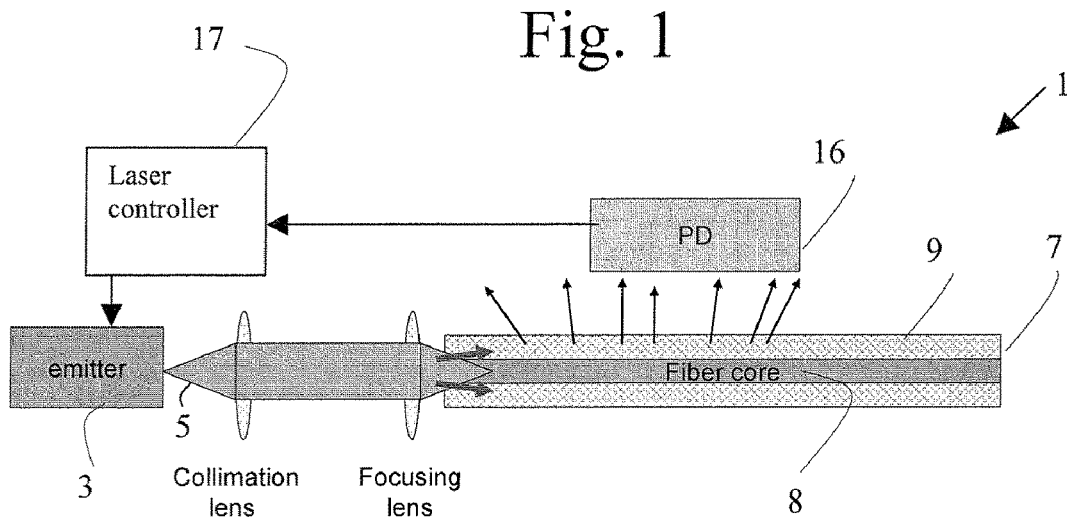
FIG. 1 is an optical circuit diagram illustrating a coupling arrangement with collimation and focusing lenses for collimating the light exiting the laser and for focusing the collimated light at the end of the optical fiber so that coupling occurs in the core and in the cladding.

Referring now to FIG. 1 a device 1 in accordance with an embodiment of this invention is shown, wherein a light emitter in the form of a laser diode 3 provides a beam of light 5 to an end of single mode optical fiber 7. As the beam is launched from the laser diode 3, it expands from nearly a point source. A collimating and a focusing lens are used to couple the light into the end of the optical fiber such that most of the light couples into the core 8 of the optical fiber and a remaining smaller portion couples into the cladding 9 about the core. A coating, not shown is present over the cladding and the light escaping the cladding escapes through the protective coating. Arrows shown to emanate from the core indicate light escaping the cladding and coating in a region entirely around the core. In order receive and detect a small portion of this light a photodiode detector 16 is disposed as shown about the core near the end of the fiber where light is launched thereinto. Ideally, the photodiode should be located close enough, typically as close as possible to maximize the solid angle and with the working surface oriented along the optical fiber. It is preferable to locate the photo detector 16 to where the strongest emission of light about the cladding is, for example near the launch end of the single mode fiber. This is also where scattering from the cladding layer is strong, thereby obviating requirements for an electronic gain circuit. Scattering decreases exponentially with increasing distance from the launch end of the optical fiber. An electrical output signal of the photodetector 16 is electrically coupled to the laser controller 17 to stabilize the power by a conventionally electronic control loop or feedback loop. Advantageously light can be detected through the protective coating of the fiber, obviating the requirement of removing the coating and potentially damaging the optical fiber. The discovery that light launched into the cladding of an optical fiber can be used to monitor an emitter, essentially directly through the protective coating over the fiber, by disposing a photodiode adjacent to the optical fiber, wherein the core light remains substantially guided, has afforded the inventors to inexpensively monitor laser light launched into the optical fiber and to conveniently control the emitter 3 in dependence upon the intensity of the detected light which has been launched into cladding and has exited the cladding.

Figure 2:
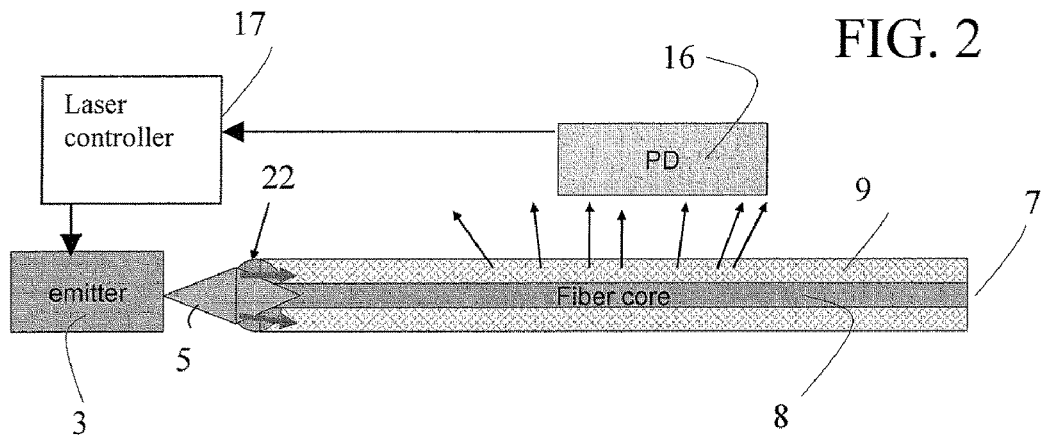
FIG. 2 is an optical circuit diagram illustrating a coupling arrangement with a single lens ensuring that diverging light emanating from the laser is focused into the core and cladding of the optical fiber in a preferred ratio.

Turning now to FIG. 2 a similar arrangement to that of FIG. 1 is shown, however a fiber lens 22 is used for coupling light into the core and cladding instead of the collimating and focusing lens used in FIG. 1.

Figure 3:
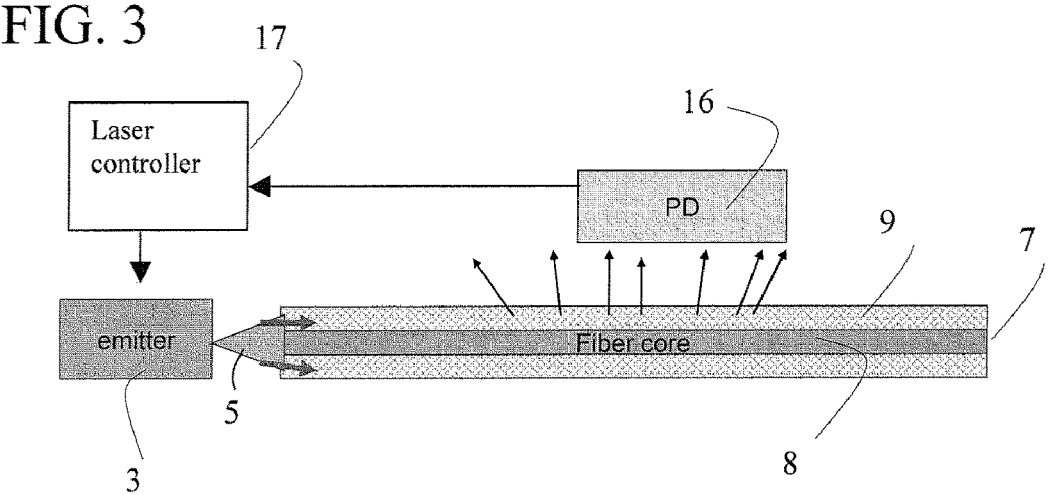
FIG. 3 is an optical circuit diagram illustrating a coupling arrangement wherein direct coupling or butt-coupling is used to couple laser light to the core and cladding of the optical fiber.

The embodiment shown in FIG. 3 directly couples light from the laser diode 3 into the end of the optical fiber such that a desired portion of the beam couples into the cladding and core in useful working ratio. This coupling scheme is known as a direct or butt-coupling scheme.

Figure 4:
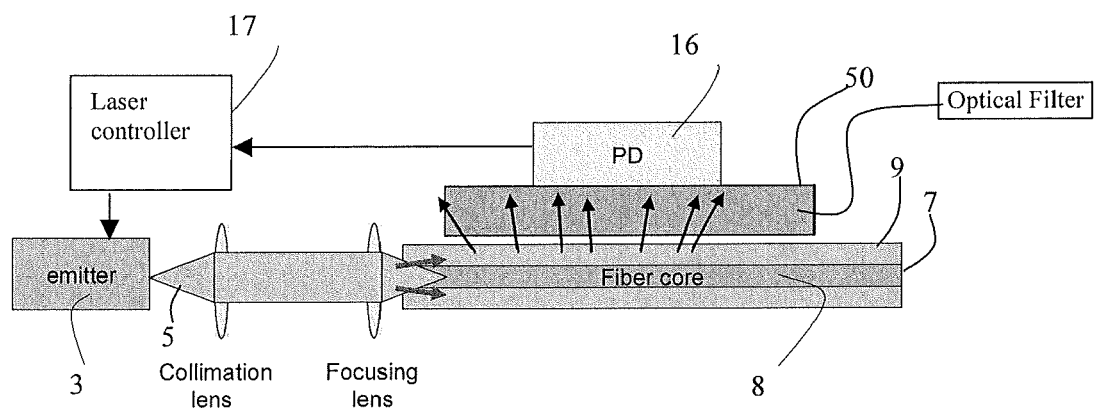
FIG. 4 is an optical circuit diagram similar to that of FIG. 2 with a filter disposed between the optical fiber and the detector for filtering predetermined wavelengths of light.
Figure 5:
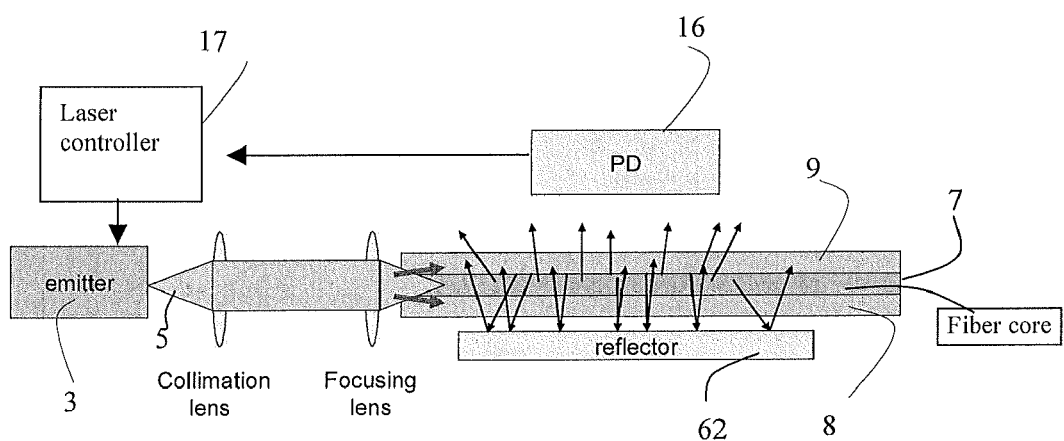
FIG. 5 is an optical circuit diagram similar to that of FIG. 2 wherein coupling lenses are used and including a back reflector for reflecting some of the light exiting the cladding toward the detector.

An alternative embodiment of the invention is shown in FIG. 4 wherein a power monitor with a filter 50 is provided such that the filter is disposed between the optical fiber 7 and the detector 16. For example the emitter or light source can perform wavelength conversion and two wavelengths can be coupled into the optical fiber 7. The transmissive optical filter 50 in only allows a predetermined wavelength to pass for detection. In the embodiments described heretofore, there is no need for the introduction of scattering elements to scatter the light onto the photodiode. However, if additional light is required at the photodiode 16, a back-reflector 62 can be provided about the cladding as shown in FIG. 5 thereby providing a stronger signal for detection at the photodiode detector 16.

Estimation of Emission from Core and Cladding

Core:

In the exemplary embodiment the single mode optical fiber used had specified core losses of 30 dB/Km. Loss in the cladding was not specified. For the purpose of calculation, if the assumption is made that all of the light launched into the core is scattered and is not absorbed, this provides an upper limit for radiation, emitted by fiber core to the cladding when light propagates through. We use for registration a photodiode with an area of approximately 25 mm$^2$ disposed approximately 5 mm from the single mode optical fiber. Taking into account the cylindrical symmetry of the light emitting optical fiber light is collected by 5 mm of fiber over 1 radian, which is $\frac{1}{2}\pi \approx 0.16$ of the emission in the whole spatial angle. Losses in a 5 mm length of fiber core are 30 dB/1000/200=1.5*10$^{-4}$ dB≈3.5*10$^{-5}$. If we launch 20 mW of light into the end of the optical fiber, a 5 mm section irradiates 20*3.5*10$^{-5}$ mW=0.7 μW, and the detector detects 16% of this radiation. $P_{core}$=0.7*0.16 μW≈0.1 μW. The sensitivity of the detector is approximately 0.04 μA/μW. Therefore the current, realized by radiation from the fiber core in the detector is approximately $I_{core}$=0.1*0.04 μA=4*10$^{-3}$ μA.

We have assumed that all losses in the core are radiation, which is not accurate. The most substantial portion of loss in the fiber core is due to absorption. Therefore the actual detected signal should be several times lower than the above estimation.

Cladding:

We were not able to find specifications for losses in the cladding of the single mode fiber used since the cladding is not considered to be a light guiding medium; the purpose of the cladding is to provide conditions under which, essentially total internal reflection occurs in the core. Our rough estimation is that losses in the cladding in the form of light mostly propagating into free-space about the cladding are 30-100 dB/m. If one takes the lower limit, 30 dB/m, the same calculation as for the core yields losses in 5 mm=30 dB/200=0.15 dB≈0.035.

Typically, when coupling light from the light emitters with non-perfect mode matching, such as from semiconductor lasers, waveguides etc., the coupling efficiency is less than 100%. Typical levels are 60-80%. Taking into account that core diameter is several microns; i.e. 3-4 microns for blue fiber, 6-8 microns for near IR and the cladding diameter is more than 100 microns, the remaining light is coupled into cladding.

If one assumes that the coupling efficiency is 80% at best. Coupling 20% of the coupled light into the cladding would yield about 4 mW. 5 mm of cladding would radiate 4*0.035 mW=140 μW. Thus, the detector would detect $P_{clad}$=140*0.16≈22 μW yielding a current $I_{clad}$=22*0.04 μA≈0.9 μA.

This estimation is in agreement with our experimental data. Typical PD current levels in our systems vary from 0.2 to 3 μA. This signal is at least 2-3 orders of magnitude stronger than signal from the core emission.

Surprisingly, a very small amount of light launched into the cladding for the purposes of detection, can provide an indication of the amount of light that is propagating in the core of a single mode optical fiber. Once the ratio of core to cladding light is known, one can monitor light exiting a region of the cladding to control the light emitting diode 3. This obviates complex monitoring schemes that have been used in the past.

What is claimed is:

1. A method of monitoring light comprising:
   launching a beam of light into an end of a single mode optical fiber having a core having a refractive index $n_1$ and having a cladding surrounding the core, having a refractive index $n_2$, wherein $n_1 > n_2$, wherein a first portion $P_1$ of the beam launched into the end of the single mode fiber is launched into the core at a first end face of the optical fiber, and wherein a second portion $P_2$ of the beam of light is launched directly into the cladding at the first end face of the optical fiber, and wherein $P_2/P_1 > 0.05$;
   detecting along a side of the optical fiber adjacent the cladding at a first location near the end of the fiber with a photodetector disposed along side of the fiber, a portion of light P3 that was launched into the fiber, wherein the portion of light $P_3$ includes more than 0.5% of $P_2$ and no more than 0.003% of $P_1$; and
   controlling the beam of light based on the $P_2/P_1$.

2. A method as defined in claim 1 wherein the step of launching the beam into the end of the single mode fiber includes the step of optically coupling an output of laser diode with the end of the single mode fiber.

3. A method as defined in claim 2 further comprising providing an output signal proportional to the light detected by the photodetector to a control circuit electrically coupled to the laser diode for controlling the beam launched into the end of the single mode fiber.

4. A method as defined in claim 2 wherein the photodetector is disposed less than 20 cm from the end of the single mode optical fiber.

5. A method as defined in claim 4 wherein in operation, at least 60% of the beam of light launched into the end of the single mode fiber enters the core of the optical fiber.

6. A method as defined in claim 5 wherein a filter is disposed between the optical fiber and the photodetector.

7. A method as defined in claim 4 wherein a protective covering over the cladding in a region closest to the photodetector is not removed.

8. A method of monitoring light comprising the steps of:
   disposing a photodetector at a first location downstream from a launch end of a single mode optical fiber;
   launching a beam having optical power P into the launch end of the optical fiber, wherein a minor portion of the beam having power $P_2$ is launched into the cladding in the launch end of the optical fiber, and wherein a major portion of the beam having power $P_1$ is launched into the core in the launch end of the optical fiber;
   detecting with the photodetector a larger portion of the beam launched into the cladding than the portion of the beam launched into the core with the detector disposed adjacent to the cladding; and
   controlling the beam having optical power P based on the ratio $P_2/P_1$.

9. A method of claim 8 wherein a region of the optical fiber about where the photodetector is disposed has a bend radius of less than or equal to 20 mm.

10. A method of claim 8 wherein a region of the optical fiber about where the photodetector is disposed has a bend radius greater than 20 mm.

11. A method as defined in claim 5, wherein no optical elements are placed between the optical fiber and the photodetector.

* * * * *